(12) United States Patent
Stewart et al.

(10) Patent No.: US 11,893,070 B2
(45) Date of Patent: Feb. 6, 2024

(54) APPARATUS AND METHODS FOR EXPANDING CONTACTS FOR A SOCIAL NETWORKING PLATFORM

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC.

( * ) Notice: Subject to any disclaimer, the term of this patent is extended or adjusted under 35 U.S.C. 154(b) by 0 days.

(21) Appl. No.: 17/667,509

(22) Filed: Feb. 8, 2022

(65) Prior Publication Data

US 2023/0252098 A1   Aug. 10, 2023

(51) Int. Cl.
*G06F 16/9536* (2019.01)
*G06F 16/9535* (2019.01)
*H04L 67/306* (2022.01)

(52) U.S. Cl.
CPC ...... *G06F 16/9536* (2019.01); *G06F 16/9535* (2019.01); *H04L 67/306* (2013.01)

(58) Field of Classification Search
CPC . G06F 16/9536; G06F 16/9535; H04L 67/306
See application file for complete search history.

(56) References Cited

U.S. PATENT DOCUMENTS

| | | | |
|---|---|---|---|
| 9,258,375 B2 * | 2/2016 | Bechtel | H04L 67/535 |
| 9,626,648 B2 | 4/2017 | Liu et al. | |
| 10,135,834 B1 * | 11/2018 | Galebach | G06Q 10/10 |
| 10,645,220 B1 * | 5/2020 | Demsey | H04M 3/4936 |
| 10,725,618 B2 * | 7/2020 | Jhaj | G06F 3/0482 |
| 11,025,573 B1 * | 6/2021 | Czajka, II | H04L 67/306 |
| 11,372,940 B2 * | 6/2022 | Ramanath | G06Q 10/063112 |

(Continued)

FOREIGN PATENT DOCUMENTS

WO   2015181584 A1   12/2015

OTHER PUBLICATIONS

Handshake, Introduce yourself with a digital business card, Jan. 6, 2022.

(Continued)

*Primary Examiner* — Etienne P Leroux
(74) *Attorney, Agent, or Firm* — Caldwell Intellectual Property Law

(57) ABSTRACT

An apparatus for expanding contacts for a social networking platform includes at least a processor communicatively connected to a user device and a memory communicatively connected to the processor. The memory contains instructions configuring the at least a processor to determine potential contacts for a user with an automated process including identifying a user identification on an immutable sequential listing, retrieving activity data linked to the user identification, retrieving a body of sets of user activity data as a function of the activity data, and identifying potential contacts by generating a match function between the user and each set of the sets of the user activity data. Processor further receives a selection input from the user device selecting a contact of the potential contacts, delivers an information request about the user to a selected contact device, and receives an information response from the selected contact device.

18 Claims, 7 Drawing Sheets

(56) References Cited

U.S. PATENT DOCUMENTS

| | | | |
|---|---|---|---|
| 2004/0186882 A1* | 9/2004 | Ting | H04L 67/306 709/202 |
| 2006/0212836 A1* | 9/2006 | Khushraj | G06F 16/954 715/866 |
| 2007/0263780 A1* | 11/2007 | Lentini | G16H 10/60 379/37 |
| 2009/0055404 A1 | 2/2009 | Heiden et al. | |
| 2009/0186638 A1* | 7/2009 | Yim | H04L 65/1006 709/206 |
| 2009/0204601 A1* | 8/2009 | Grasset | G06F 16/9535 707/999.005 |
| 2011/0252081 A1* | 10/2011 | Noor | G06Q 10/00 709/217 |
| 2012/0209839 A1* | 8/2012 | Andrews | H04L 67/18 707/E17.014 |
| 2013/0055393 A1* | 2/2013 | Youn | G06F 21/6245 726/23 |
| 2013/0067351 A1* | 3/2013 | Yokoi | G06Q 10/107 715/752 |
| 2014/0289014 A1* | 9/2014 | Wisz | G06Q 30/0203 705/7.32 |
| 2014/0372176 A1* | 12/2014 | Fusz | G06Q 30/02 705/7.32 |
| 2015/0081575 A1 | 3/2015 | Jaffe et al. | |
| 2015/0095325 A1* | 4/2015 | Kim | H04W 4/38 707/724 |
| 2015/0283463 A1* | 10/2015 | Marat | A63F 13/48 463/42 |
| 2016/0140672 A1* | 5/2016 | Shnitzer | G06F 3/0482 715/753 |
| 2016/0189147 A1* | 6/2016 | Vanczak | H04L 63/0838 705/71 |
| 2017/0012927 A1 | 1/2017 | Wollan Fan et al. | |
| 2017/0032325 A1* | 2/2017 | Venkataraman | G06F 16/245 |
| 2017/0103134 A1 | 4/2017 | Garbowicz | |
| 2017/0300580 A1* | 10/2017 | Puzis | H04L 67/306 |
| 2018/0213046 A1* | 7/2018 | Cherdabayev | H04L 67/306 |
| 2018/0374097 A1* | 12/2018 | Hanna | H04L 63/123 |
| 2019/0043137 A1* | 2/2019 | Mathis | H04L 51/52 |
| 2019/0066055 A1 | 2/2019 | Ruiz et al. | |
| 2019/0129401 A1* | 5/2019 | Chai | G06F 9/453 |
| 2019/0244307 A1 | 8/2019 | Ryan et al. | |
| 2019/0325532 A1 | 10/2019 | Torrenegra et al. | |
| 2020/0036740 A1* | 1/2020 | Ford | H04L 63/1425 |
| 2020/0151752 A1* | 5/2020 | Kazlou | G06Q 30/0282 |
| 2020/0259643 A1* | 8/2020 | Pazhoor | G06F 21/32 |
| 2021/0125699 A1* | 4/2021 | Vergara, Jr. | G06Q 40/08 |
| 2021/0314137 A1* | 10/2021 | Lindeman | H04L 9/3239 |
| 2021/0334589 A1* | 10/2021 | Plant | G06F 9/542 |
| 2021/0390558 A1* | 12/2021 | Cheng | G06Q 10/10 |
| 2022/0101161 A1* | 3/2022 | Goel | G06N 20/00 |
| 2022/0376889 A1* | 11/2022 | Kaizer | H04L 9/008 |

OTHER PUBLICATIONS

Orbiit, How it works, Jan. 6, 2022.
Sumry, Build a resume & website in minutes that gets you hired., Jan. 6, 2022.

* cited by examiner

APPARATUS AND METHODS FOR EXPANDING CONTACTS FOR A SOCIAL NETWORKING PLATFORM

FIELD OF THE INVENTION

The present invention generally relates to the field of social networking platforms. In particular, the present invention is directed to apparatus and methods for expanding contacts for a social networking platform.

BACKGROUND

Searching for and adding contacts to a social networking platform is labor some and inefficient.

SUMMARY OF THE DISCLOSURE

In an aspect of the present disclosure is an apparatus for expanding contacts for a social networking platform, the apparatus including: at least a processor communicatively connected to a user device; and a memory communicatively connected to the processor, the memory containing instructions configuring the at least a processor to determine potential contacts for a user wherein determining is an automated process including identifying a user identification on an immutable sequential listing, retrieving activity data linked to the user identification, retrieving a body of sets of user activity data as a function of the activity data, and identifying potential contacts by generating a match function between the user and each set of the sets of the user activity data; receive a selection input from the user device selecting a contact of the potential contacts; deliver an information request about the user to a selected contact device; and receive an information response from the selected contact device.

In another aspect of the present disclosure is a method for expanding contacts for a social networking platform, the method including: determining, by at least a processor, potential contacts for a user wherein determining is an automated process including identifying a user identification on an immutable sequential listing, retrieving activity data linked to the user identification, retrieving a body of sets of user activity data as a function of the activity data, and identifying potential contacts by generating a match function between the user and each set of the sets of the user activity data; receiving, at the at least a processor, a selection input from the user device selecting a contact of the potential contacts; delivering, by the at least a processor, an information request about the user to a selected contact device; and receiving, at the at least a processor, an information response from the selected contact device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
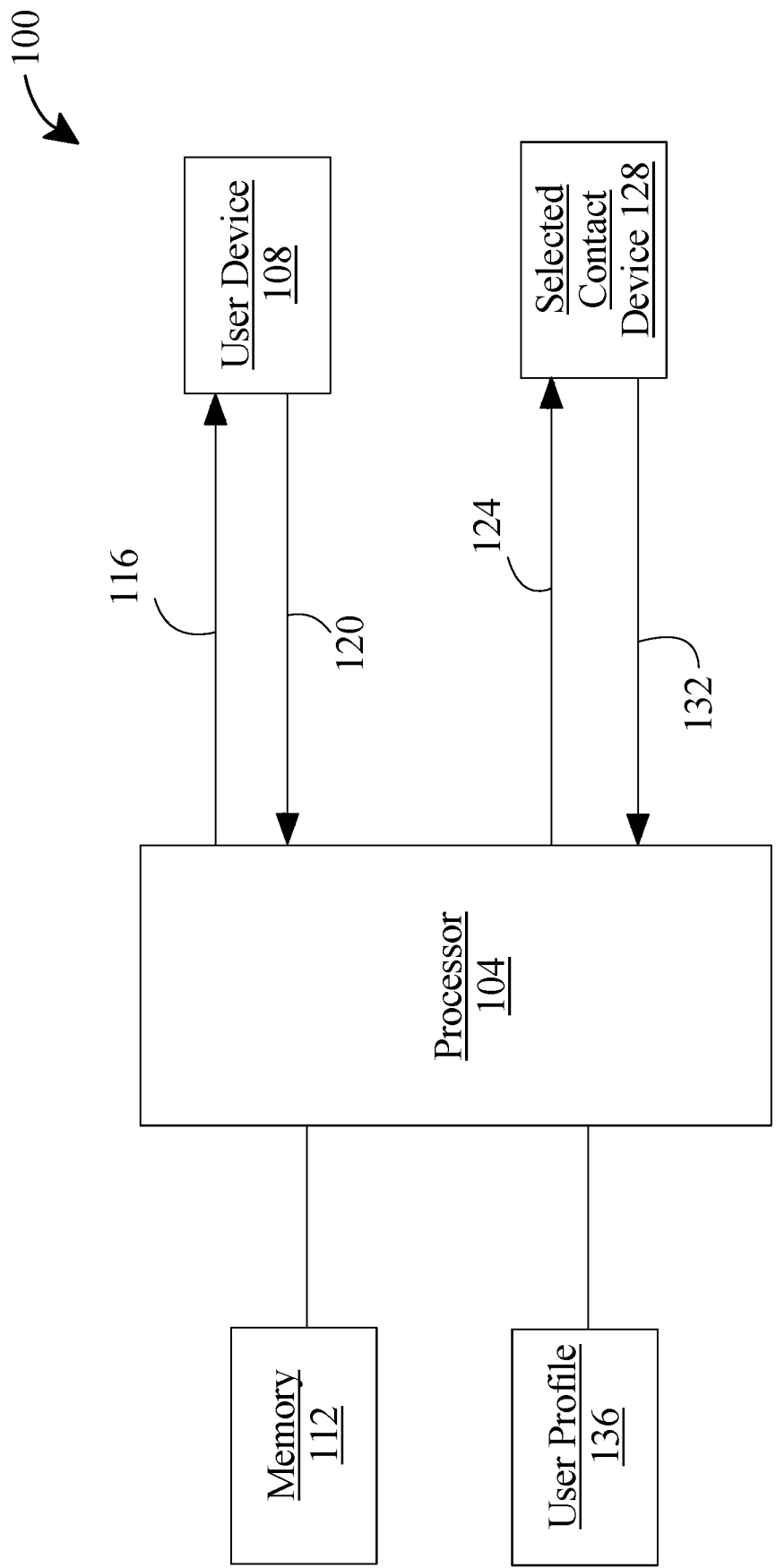
FIG. 1 is a block diagram of an embodiment of an apparatus for expanding contacts for a social networking platform.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for expanding contacts for a social networking platform. In an embodiment, a processor may be configured to determine potential contacts for a user. The potential contacts are contacts that the user may want to add as contacts to the social networking platform and/or provide information about the user to be included on the user's user profile. The processor may determine potential contacts by analyzing contact lists on the user's one or more devices such as a smart phone, determining with whom the user has spoken frequently and often, and finding people, business entities, and/or organizations that share commonalities with the user, such as mutual contacts, similar industries, similar geographical locations, and the like. The user may select one or more of the potential contacts. The processor may then send an information request to the selected contact for information about the user, such as information pertaining to the user's skills, qualifications for a type of work or profession, job history, strengths, and/or attributes. The processor may receive an information response from the selected contact and include part or all of the information response on the user's profile. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $0(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Now referring to FIG. 1, an apparatus 100 for expanding contacts for a social networking platform is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 may be communicatively connected to a user device 108. As used in this disclosure, "communicatively connected" means connected by way of a connection, attachment or linkage between two or more related which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

As used in this disclosure, a "user device" is a computing device controlled and/or operated by a user. Computing device may be any computing device described in this disclosure, such as a processor communicatively connected to a memory. User device 108 may be a personal computer such as a desktop, laptop, smart phone, and/or the like. Processor 104 may be configured to require credentials from user device 108, such as a username and a password, to verify the identity of user. Processor 104 may send verification to user, such as an email to user's email address and/or a text message to user's phone saved on a memory and/or database to which processor 104 has access. Verification may include a link to click that sends a verification to processor 104. Verification may include a temporary code for user to then input from user device 108 to confirm that the device is user device 108.

With continued reference to FIG. 1, processor 104 may be communicatively connected to a social networking platform such as, for example, a career and employment networking platform for employees, contractors, employers, business entities, and/or the like. Social networking platform may host job postings from employers who seek the filling of a job position. Social networking platform may provide a network by which users may develop and expand their professional network. Users of social network platform may create contacts for the social network platform. User may search for people, business entities, organizations, and/or the like that are also users on social networking platform to add them as contacts of the user. Apparatus 100 includes a memory 112 communicatively connected to processor 104. Memory 112 may be configured to store information and/or datum related to apparatus 100, such as credentials of user for verification, as discussed above. Memory 112 may contain instruction configuring processor 104 to execute any steps described in this disclosure.

Still referring to FIG. 1, processor 104 may be configured to determine potential contacts 116 for a user. As used in this disclosure, a "user" is a participant and/or member of the social networking platform. For example, user may have an account with social networking platform and login credentials to access the account. Processor 104 may gather potential contacts 116 from one or more information sources. As used in this disclosure, a "potential contact" is a person or entity that contact may want to add as a contact on social networking platform and/or from whom the user may want to receive information to add to the social networking platform. As used in this disclosure, an "information source" is a source that contains one or more contacts of a user. An information source may include a contact list in a user device 108, social media platform, social media account, email account contacts, and/or the like. Processor 104 may be configured to determine potential contacts 116 by analyzing contact details saved in user device 108. For example, processor 104 may be configured to search saved contacts in user's phone. Determining potential contacts 116 may be based on how frequently and/or how recently user communicated with the contacts. Processor 104 may review a history of user's correspondence via user's phone to determine with which of the contacts in user's phone the user frequently speaks. Processor 104 may exclude contacts that are unlikely to be business or professional contacts, such as "Mom", "Dad", "Aunt Betty", etc. Processor 104 may be configured to target contacts that are business or professional contacts. For example, processor 104 may review contacts in user's work email account. Processor 104 may also pull contact information of contacts in user's phone such as, for example, email and/or phone number. Processor 104 may be configured to determine potential contacts 116 by analyzing contacts of user in a social media account of the user. Processor 104 may request access to information source from user before accessing the information source. For example, processor 104 may request access to user's phone contacts, email contacts, and/or contacts for specific social media accounts. User may grant access to one or more information sources. Processor 104 may only access information sources of which processor 104 receives permission to do so from user. In some embodiments, processor 104 may prompt user for potential contacts 116 and/or contact information of the potential contacts 116, such as email address and/or phone number, so user is supplying potential contacts 116. Processor 104 may review other current users on social networking platform and determine one or more current users are potential contacts 116 for user. The determination may be based on mutual contacts by user and other current users, a similarity in industries, similarity in profession, similarity in geographical location, same educational institutions attended, same employers, and/or the like.

Still referring to FIG. 1, determining potential contacts 116 may be an automated process including identifying a user identification on an immutable sequential listing. As used in this disclosure, a "user identification" is a feature and/or datum demonstrating an association with a user. User identification may include a digital signature of user as described in this disclosure, user's date of birth, user's place of birth, user's name, user's facial features, and/or any datum usable as an "address" as used in an immutable sequential listing. For example, processor 104 may be configured to identify user's digital signature on immutable sequential listing. Processor 104 may receive user identification from user and compare this user identification with user identification identified on immutable sequential listing. Immutable sequential listing may include immutable sequential listing 400 described in this disclosure, including a blockchain. Processor 104 may identify user identification based on user and/or a user role. As used in this disclosure, a "user role" is a position, title, chair, credential, and/or affiliation in a business entity, organization, and/or educational institute that a user has held or does hold. User role may include, for example, being president of a company, member of a professional organization, or assistant professor at a university. Disclosure pertaining to associating user identification and user role can be found in U.S. patent application Ser. No. 17/667,495 filed on Feb. 8, 2022, and entitled "APPARATUSES AND METHODS FOR REVEALING USER IDENTIFIERS ON AN IMMUTABLE SEQUENTIAL LISTING", the entirety of which in incorporated herein by reference.

Further referring to FIG. 1, determining potential contacts 116 may include retrieving activity data linked to user identification. As used in this disclosure, "activity data" are data representing and/or describing one or more activities involving one or more people, organizations, and/or business entities. Activity data may include, for example, attending a function such as a networking event, industry expo, lecture, and/or the like; attending, being employed by, or otherwise being associated with an educational institution such as a high school and/or university; being employed by a business entity; and/or being a member in a club or organization such as a fraternity, sorority, academic honor society, networking organization, professional organization, sports team, and/or the like. Activity data may also include any change to the above, such as transferring to another college or changing employment. Activity data may include specifications of the activity such as dates corresponding to the activity and/or a description of a level of involvement in the activity. Processor 104 may retrieve activity data from a database and/or store the activity data in a memory and retrieve from the memory. Retrieval of activity data may include an initial matching. For example, processor 104 may implement a match function, as discussed below, to match user with activity data retrieved. Match may be based on user identification.

Determining potential contacts 116 may include retrieving a body of sets of user activity data as a function of activity data. As used in this disclosure, "user activity data" is activity data describing one or more activities involving a user. A body of sets may include one or more digitally signed assertions and/or sub-listings on immutable sequential listing as discussed in this disclosure. In some embodiments, determining potential contacts 116 may include retrieving a body of sets of user activity data as a function of specific category data from user activity data, such as industries, educational institutions, clubs, organizations, and/or the like in which user is involved. As an example, if processor 104 retrieves dates when user attended a university as activity data, the processor 104 may retrieve a list of students and/or faculty that attended or worked at the university during one or more of the retrieved dates. Determining potential contacts 116 may include identifying the potential contacts 116 by generating a match function between user and each set of sets of user activity data. Match function may include matching user with people, organizations, and/or business entities associated with sets of user activity data.

Figure 6:
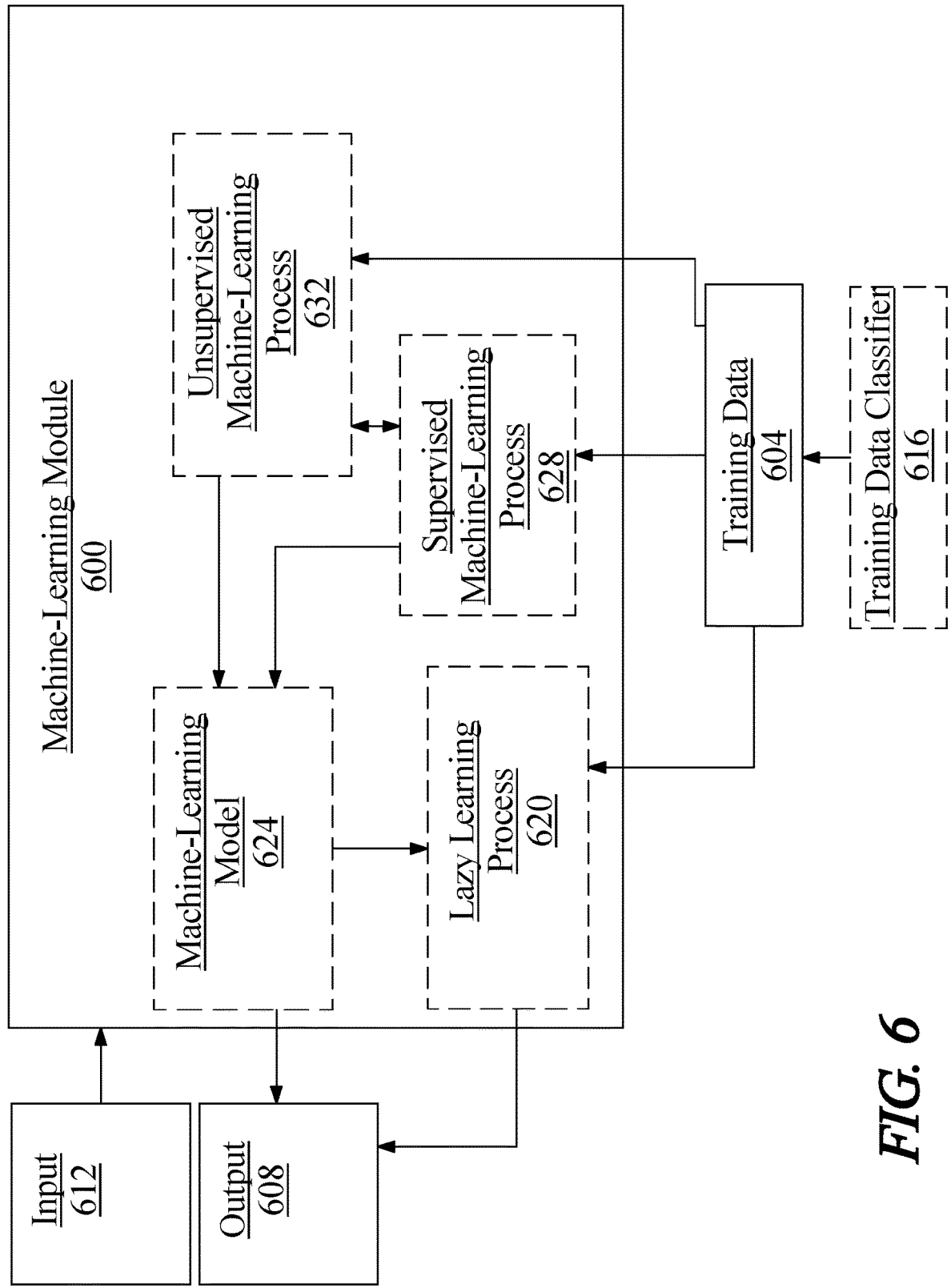
FIG. 6 is a block diagram of exemplary machine-learning processes.

Still referring to FIG. 1, match function may include utilizing a classifier and/or a machine-learning model as discussed in reference to FIG. 6. A classifier may be configured to output at least a datum that labels or otherwise identifies a set of data that are clustered together, found to be close under a distance metric as described below, or the like. Machine-learning module may generate a classifier using a classification algorithm, defined as a processes whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier may classify elements of training data to user and/or user activity data.

With continued reference to FIG. 1, once processor 104 has determined potential contacts 116, the processor 104 may be configured to send user device 108 the potential contacts 116 for review. Processor 104 may be configured to receive a selection input 120 from user device 108 that includes a selection of one or more contacts of potential contacts 116. Selection input 120 may include identification of which potential contacts 116, if any, user wants to be the user's contacts on social networking platform and/or from which of the potential contacts 116 the user wants sent an information request 124, as discussed below.

Still referring to FIG. 1, processor 104 may be configured to deliver an information request 124 about the user to a selected contact device 128. As used in this disclosure, a "selected contact device" is a computing device controlled and/or operated by a contact selected by a user among potential contacts 116. Computing device may be any computing device described in this disclosure, such as a processor 104 communicatively connected to memory 112. User device 108 may be a personal computer such as a desktop, laptop, smart phone, and/or the like. Processor 104 may deliver information request 124 or a notification and/or link to information request 124 via email and/or text. As used in this disclosure, an "information request" is a request to provide information concerning a user such as, for example, the user's skills, qualifications for a type of work or profession, job history, strengths, and/or attributes. Information request 124 may be freeform wherein selected contact may write information concerning user. Information request 124 may include one or more topics for selected contact to write about and/or one or more questions for selected contact to answer concerning the user. Information request 124 may include a list of strengths and/or attributes from which selected contact to choose that most represent user. For example, information request 124 may include a list of attributes, such as "driven", "attentive to detail", "personable", "team player", "hard worker", "loyal", "reliable", etc., of which selected contact may select one or more. Information request 124 may provide a list of qualifications, strengths, and/or attributes for selected contact to rank from most descriptive of user to least descriptive of the user. Information request 124 may provide one or more qualifications, strengths, and/or attributes for selected contact to separately rate, such as on a number or letter scale, based on how well each describes user. Information request 124 may be tailored by user device 108. For example, user device 108 may tailor information request 124 to a first contact selected among potential contacts 116 to request that the first contact rate the user's managerial skills. User device 108 may tailor information request 124 to a second contact selected among potential contacts 116 to request that the second contact select user's strengths among a list of possible strengths. Processor 104 may be configured to require credentials from selected contact device 128, such as a username and a password, to verify the identity of selected contact. If selected contact is not a current user on social networking platform, the selected contact may first be required to register on the social networking platform or obtain temporary credentials prior to submitting information response 132. The networking platform may prompt selected contact to create a user profile on social networking platform and/or upload the selected contact's own skills, qualifications, job history, and/or the like if the selected contact is not a current user of the social networking platform. Processor 104 may send verification to user, such as an email to user's email address and/or a text message to user's phone saved on a memory and/or database to which processor 104 has access. Verification may include a link to click that sends a verification to processor 104. Verification may include a temporary code for selected contact to then input from selected contact device 128 to confirm that the device is selected contact device 128.

With continued reference to FIG. 1, processor 104 may be configured to receive an information response 132 from selected contact device 128. Information response 132 may provide information about user such as, for example, the user's skills, qualifications for a type of work or profession, job history, strengths, and/or attributes as described above. Processor 104 may be communicatively connected to a user profile 136, wherein processor 104 is configured to add at least an element of information response 132 to user profile 136. As used in this disclosure, a "user profile" is one or more digital pages that hosts information about a user and/or information added by the user on a social networking platform. As discussed above, apparatus 100 may be communicatively connected a network. User profile 136 may be on network. Processor 104 may be configured to add at least an element of information response 132 to user profile 136. In some embodiments, processor 104 may be configured to request approval from user device 108 to add information response 132 to user profile 136. Processor 104 may add information response 132 to user profile 136 only if processor 104 receives approval from user device 108. User profile 136 may include identification of selected contact who provided information response 132. Information response 132 may be included verbatim on user profile 136. Excerpts of information response 132 may be included on user profile 136. Information response 132 may be summarized on user profile 136. Data from information response 132 may be combined with data from other information response 132s to create a summary of the total data, which processor 104 may include on user profile 136. Processor 104 may be configured to provide to selected contact device 128 access to view a portion or all of user profile 136. Selected contact device 128 may receive access to user profile 136 with information request 124, which may allow selected contact to review user's information listed on the user profile 136 before submitting information response 132. In some embodiments, selected contact may only be given access to user profile 136 once information response 132 is submitted.

Still referring to FIG. 1, information request 124 may be based on user profile 136. For example, if user profile 136 includes information about user being an electrical engineer, information request 124 may ask selected contact to rate the user's math skills, analytical skills, communication skills, and/or the like. Processor 104 may prompt user device 108 to upload user's resume. Processor 104 may extract information from user's resume to auto-generate information about the user's skills, qualifications, strengths, attributes, and/or the like on user profile 136. Extracting information from a user file, such as a resume, and adding information to a user profile 136 is detailed in U.S. patent application Ser. No. 17/667,479 filed on Feb. 8, 2022 and entitled "APPARATUS AND METHODS FOR UPDATING A USER PROFILE BASED ON A USER FILE" and U.S. patent application Ser. No. 17/582,081 filed on Jan. 24, 2022 and entitled "APPARATUS AND METHOD FOR SECURELY CLASSIFYING APPLICATIONS TO POSTS USING IMMUTABLE SEQUENTIAL LISTINGS" which are both incorporated herein by reference in their entirety. Processor 104 may be configured to post a digitally signed assertion in an immutable sequential listing 400, as discussed below. For example, processor 104 may post user profile 136, information request 124, information response 132 on immutable sequential listing 400.

Still referring to FIG. 1, processor 104 determines a plurality of scores, wherein each score represents at least an attribute of a subject person profile of the plurality of subject person profiles. As used in this disclosure a "score" is a numerical value representing one or more attributes of subject person profile. As used in this disclosure an "attribute" is a quality, feature, and/or characteristic of a subject person. In an embodiment, and without limitation, attribute may include one or more characteristics such as generosity, integrity, loyalty, devoted, loving, kindness, sincerity, self-control, peaceful, faithful, patience, determination, persistence, open-minded, fair, cooperative, tolerant, optimistic, spiritual, and the like thereof. In an embodiment, and without limitation, score may be a numerical value representing attribute, wherein score may include a numerical value such as 20 for generosity, 15 for loyalty, 99 for perseverance, and the like thereof.

Still referring to FIG. 1, processor 104 calculates a plurality of talent and risk calculation scores as a function of the plurality of scores. As used in this disclosure a "talent and risk calculation score" is a score that assess talent and/or risk regarding a subject person. In an embodiment, and without limitation, talent and risk calculation score may include any of the talent and risk calculation score as described above. In an embodiment, and without limitation, talent and risk calculation score may include a career score. In another embodiment, and without limitation, talent and risk calculation score may include a skill score, a validator integrity score, a candidate reliability score, an achievement and/or certificate score, a social engagement score, a background screening score, an active volunteer score, an academic merit score, an experience merit score, or the like thereof. In another embodiment, and without limitation, calculating talent and risk calculation score may further include producing a first attribute grouping as a function of a first plurality of scores. As used in this disclosure an "attribute grouping" is a group of attributes associated to a user that share similar characteristics. For example, attribute grouping may include grouping one or more attributes associated to reliability such as but not limited to tardiness factors, time management, deadline maintenance, and the like thereof. As a further non-limiting example, attribute grouping may include grouping one or more attributes associated to improper behavior such as but not limited to vulgar language, violent actions, disregard for rules, and the like thereof. In an embodiment, and without limitation, processor 104 may generate a second attribute grouping as a function of a second plurality of scores. For example, and without limitation, processor 104 may generate a first attribute grouping including a group of attributes associated to honesty and a second attribute group associated to quality of work. In an embodiment, and without limitation, processor 104 may calculate each talent and risk calculation score as a function of the first attribute grouping and the second attribute grouping using a filtering algorithm, wherein a filtering algorithm is described below in detail. Additionally or alternatively, calculating each talent and risk calculation score of the plurality of talent and risk calculation scores may include producing a digital signature as a function of the at least a subject profile. In an embodiment, and without limitation, producing digital signature may further include receiving a validation record as a function of a third-party validator. In another embodiment, computing device produces digital signature as a function of the validation record and the plurality of subject person profiles.

Still referring to FIG. 1, processor 104 may generate an idealistic threshold as a function of the score ideals. As used in this disclosure an "idealistic threshold" is a limit that a talent and risk calculation score should maintain. In an embodiment, and without limitation, idealistic threshold may be determined as a function of a user input, idealistic database, previous iteration of generating a candidate grouping, and the like thereof. For example, and without limitation, processor 104 may determine idealistic threshold as a function of an employer entering that an idealistic threshold should be 40 for reliability. For example, and without limitation, idealistic threshold may denote that a talent and risk calculation score should not be below 80 for candidate reliability, wherein the score ideal may be 90. As a further non-limiting example, idealistic threshold may denote that a talent and risk calculations core should not exceed 70 for tardiness, wherein the score ideal may be 10.

Still referring to FIG. 1, processor 104 may receive a confidence index as a function of the digital signature. As used in this disclosure a "confidence index" is a measurable value associated with a level of probability that subject person profile, score, and/or talent and risk calculation score is accurate. For example, and without limitation, confidence index may denote that a high probability exists that a subject person profile is accurate as a function of digital signature validation. As a further non-limiting example, confidence index may denote that a high probability exists that talent and risk calculation score representing candidate efficiency is accurate as a function of digital signature validation. In another embodiment, and without limitation, confidence index may be received as a function of one or more confidence-index machine-learning models, wherein a confidence-index machine learning model is a machine-learning model that receives a digital signature and a probability of accuracy and outputs a confidence index, and wherein a machine-learning model is described above. Confidence-index machine-learning model may be trained as a function of a confidence-index training set As used in this disclosure a "confidence-index training set" is a training set that correlates a digital signature and a probability of accuracy to a confidence index. For example, and without limitation, confidence-index training set may correlate a digital signature of validated and a high probability of accuracy to a confidence interval of 94. Confidence-index training set may be obtained as a function of a previously received and/or determined confidence index during a previous iteration of determining confidence index. The confidence training set may be received as a function of one or more feedback elements, wherein a feedback element is described below. The confidence training set may be received by one or more remote devices that at least correlate a digital signature and/or a probability of accuracy to a confidence index. The confidence training set may be received in the form of one or more user-entered correlations of a digital signature and/or probability of accuracy to a confidence index. In an embodiment, processor 104 may produce a weighted talent and risk calculation score as a function of the confidence index. As used in this disclosure a "weighted talent and risk calculation score" is a talent and risk calculation score that is adjusted and/or modified as a function of the confidence index. For example, and without limitation, a confidence index of 4 may weight and/or adjust a talent and risk calculation score representing reliability from 92 to 71. In an embodiment, and without limitation, processor 104 may generate candidate grouping as a function of the weighted talent and risk calculation score. For example, and without limitation, processor 104 may utilize the weighted talent and risk calculation score of 81 due to a low confidence index for education level to generate candidate grouping as opposed to the talent and risk calculation score of 94.

Figure 2:
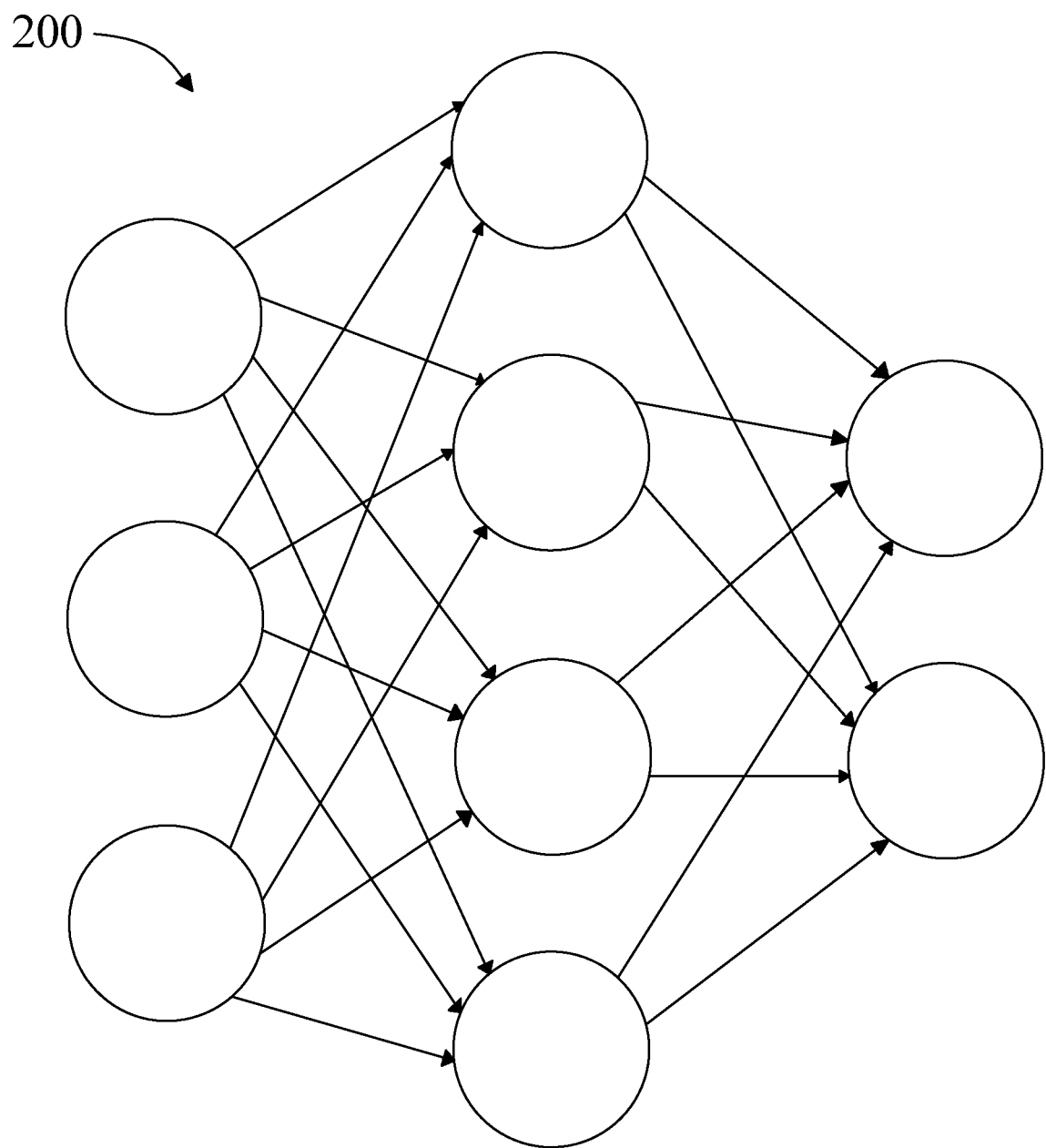
FIG. 2 illustrates an exemplary neural network.

Referring now to FIG. 2, an exemplary embodiment of neural network 200 is illustrated. A neural network 200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 3:
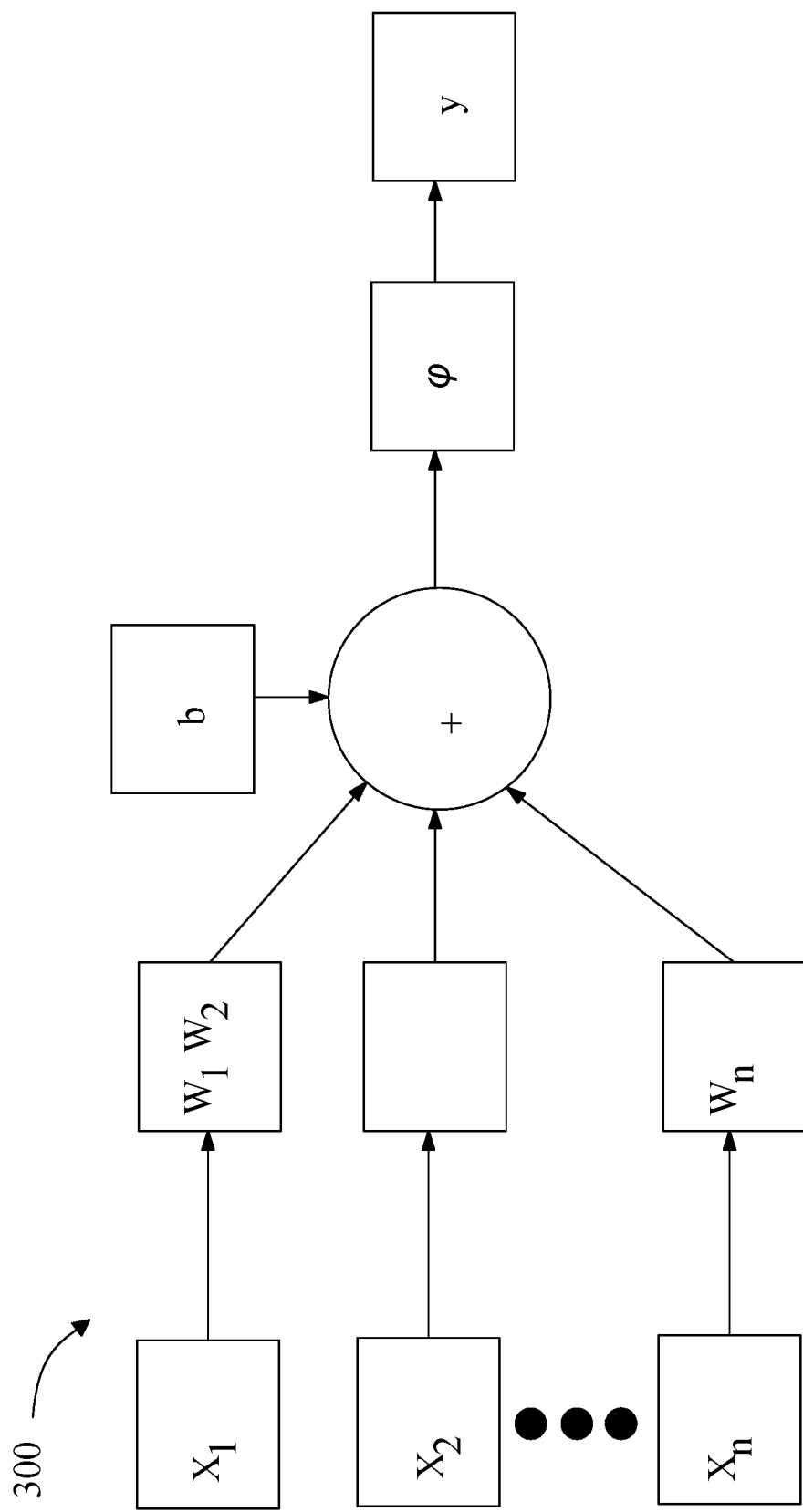
FIG. 3 is a block diagram of an exemplary node.

Referring now to FIG. 3, an exemplary embodiment of a node 300 of a neural network is illustrated. Node 300 may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 4:
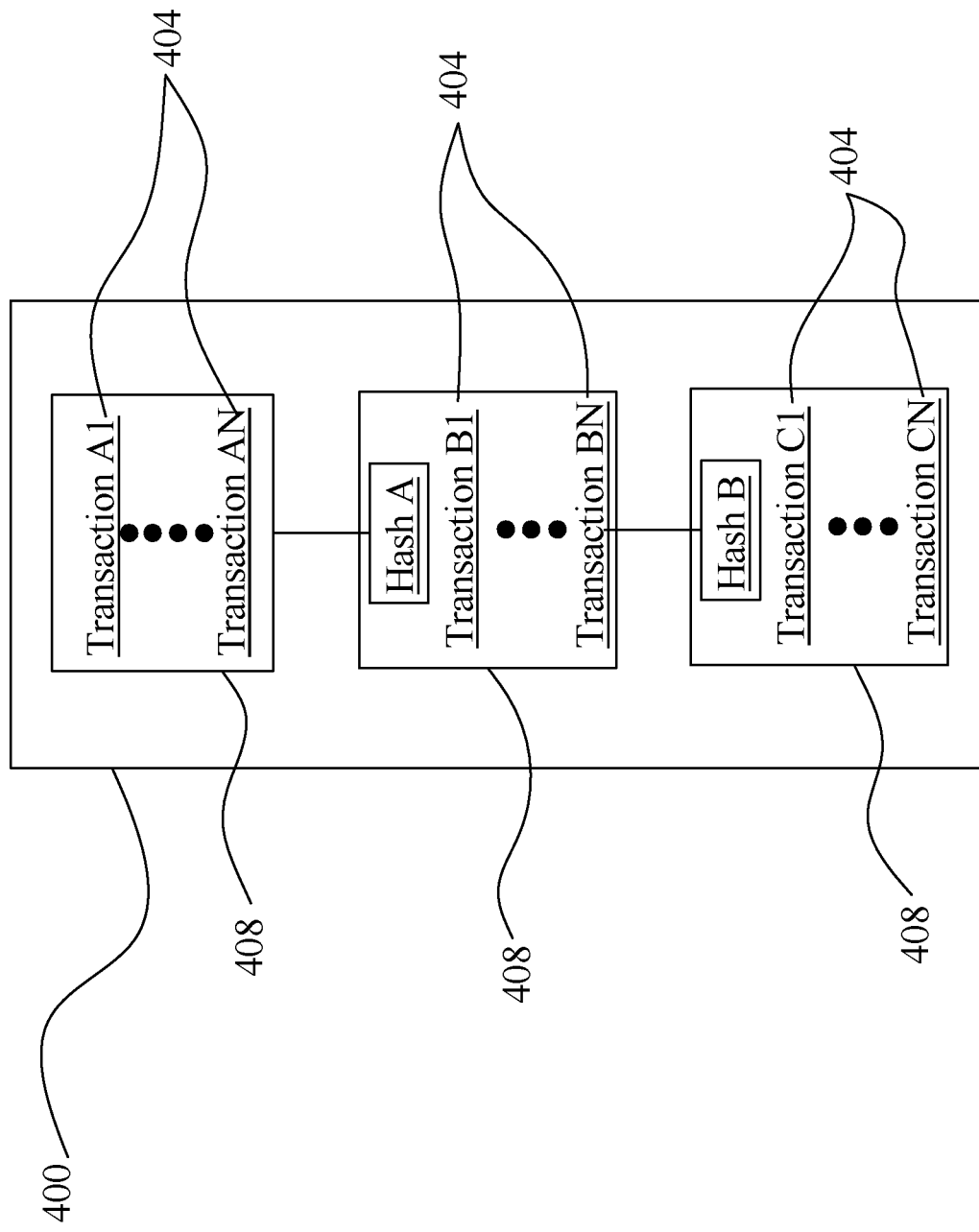
FIG. 4 is a block diagram of an exemplary immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like. Data elements may include, without limitation, one or more at least a digitally signed assertion. In one embodiment, a digitally signed assertion 404 is a collection of textual data signed using a secure proof as described in further detail below; secure proof may include, without limitation, a digital signature. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, in some embodiments, an address is a textual datum identifying the recipient of virtual currency or another item of value, such as information response 132, in a digitally signed assertion 404. In some embodiments, address may be linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. Selection input 120, information request 124, information response 132, and/or user profile 136 may be posted on immutable sequential listing 400, such as blockchain. Training data for any machine-learning module discussed in this disclosure may be posted on immutable sequential listing 400, such as blockchain. A master list may be included. Master list may include a hash-table and/or distributed hash table which may be used to locate a requestor-linked data store. For example, a public key associated with a requestor containing location information pertaining to requestor-linked data store may be converted into a series of hash functions. This may occur by converting an entry into a series of integers by using a hash function. A hash function may include any function that may be used to map a set of data which falls into the hash table. Hash functions may be stored in a hash table, where it can be quickly retrieved using a hashed key. The hashed key may then be used to access requestor-linked data store when prompted. Using the hashed key, a hash function may compute an index that may suggest where requestor-linked data store may be found. Locating may also be performed by linking the at least an encrypted data record to a digital signature associated with the requestor. Requestor may produce a digital signature, which may then be linked to the at least an encrypted data record and locate to the location of the at least an encrypted data record. When the digital signature is presented, it may contain location information of the at least an encrypted data record and allow access control regulator to locate the precise location of encrypted data record. For example, digital signature may be generated using a public and/or private key linked to requestor which may contain location information of encrypted data record. In an embodiment, encrypted data record may be linked to a requestor key, so that when a requestor key is presented, location of encrypted data record becomes apparent. Locating may also be performed by information that may be contained in data access request. For example, a data access request associated with a user may contain location information of encrypted data record that requestor is attempting to access. When generating a data access request, requestor may specify the location of encrypted data record that may then be transmitted to access control regulator. Additional disclosure pertaining to immutable sequential listing can be found in U.S. patent application Ser. No. 17/486,461 filed on Sep. 27, 2021, and entitled "SYSTEMS AND METHODS FOR SCORE GENERATION FOR APPLICANT TRACKING", the entirety of which in incorporated herein by reference.

With continued reference to FIG. 4, the ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp. Immutable sequential listing 400 and/or any component of the immutable sequential listing 400, such as sub-listing 408 and digitally signed assertions 404, may be validated by processor 104 consistent with disclosure of validation in U.S. patent application Ser. No. 16/698,182 filed on Nov. 27, 2019 and titled "SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT", which is incorporated by reference herein in its entirety.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain may contain a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408, protocol may adjust the algorithm to produce the next sub-listing 408 so that it will require more steps; where one sub-listing 408 takes more time for a given set of computing devices to produce the sub-listing 408, protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408. Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained in the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), 24 ertifyicates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Figure 5:
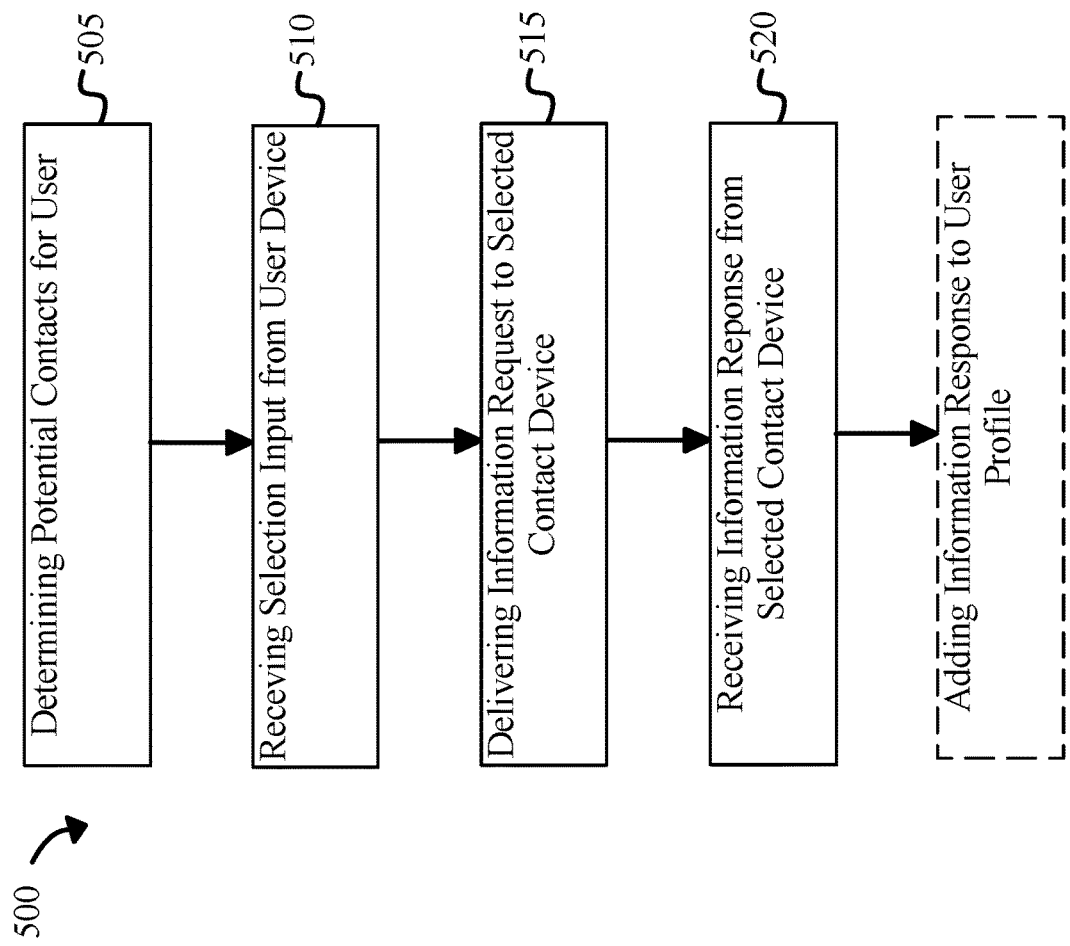
FIG. 5 is a flow diagram of an exemplary method for expanding contacts for a social networking platform.

Now referring to FIG. 5, an exemplary embodiment of a method 500 for expanding contacts for a social networking platform is illustrated. At step 505, processor determines potential contacts for user; this may be implemented, without limitation, as described above in reference to FIGS. 1-5. Processor may be configured to determine potential contacts by analyzing contact details saved in user device, wherein determining is an automated process including identifying user identification on immutable sequential listing, retrieving activity data linked to user identification, retrieving body of sets of user activity data as function of the activity data, and identifying potential contacts by generating match function between user and each set of sets of user activity data. Identifying user identification may include identifying digital signature. Sets of user activity data may include sub-listing on immutable sequential listing. Processor may be configured to determine potential contacts by analyzing contacts of user in a social media account of user.

At step 510, processor receives selection input from user device selecting a contact of potential contacts; this may be implemented, without limitation, as described above in reference to FIGS. 1-5.

At step 515, processor delivers information request about user to selected contact device; this may be implemented, without limitation, as described above in reference to FIGS. 1-5. Processor may be configured to provide to selected contact device access to user profile, which will allow the selected contact to reviewing information about user on the user profile before submitting information response. Information request may be tailored by user device.

At step 520, processor receives information response from selected contact device; this may be implemented, without limitation, as described above in reference to FIGS. 1-5. Processor may be communicatively connected to user profile, wherein the processor may be configured to add at least an element of information response to the user profile. Processor may request approval from user device to add at least an element of information response to user profile, and the processor may add the at least an element of information request to the user profile if the processor receives approval from the user device. Information response may identify selected contact who provided the information response so viewers of user profile may know who provided the information. Information response may describe a qualification of user. User profile may be stored on immutable sequential listing.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example, input data may include user information such as user identification, and output data may include one or more sets of user activity data.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to user and/or user activity data.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may user information such as user identification as described above as inputs, one or more sets of user activity data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
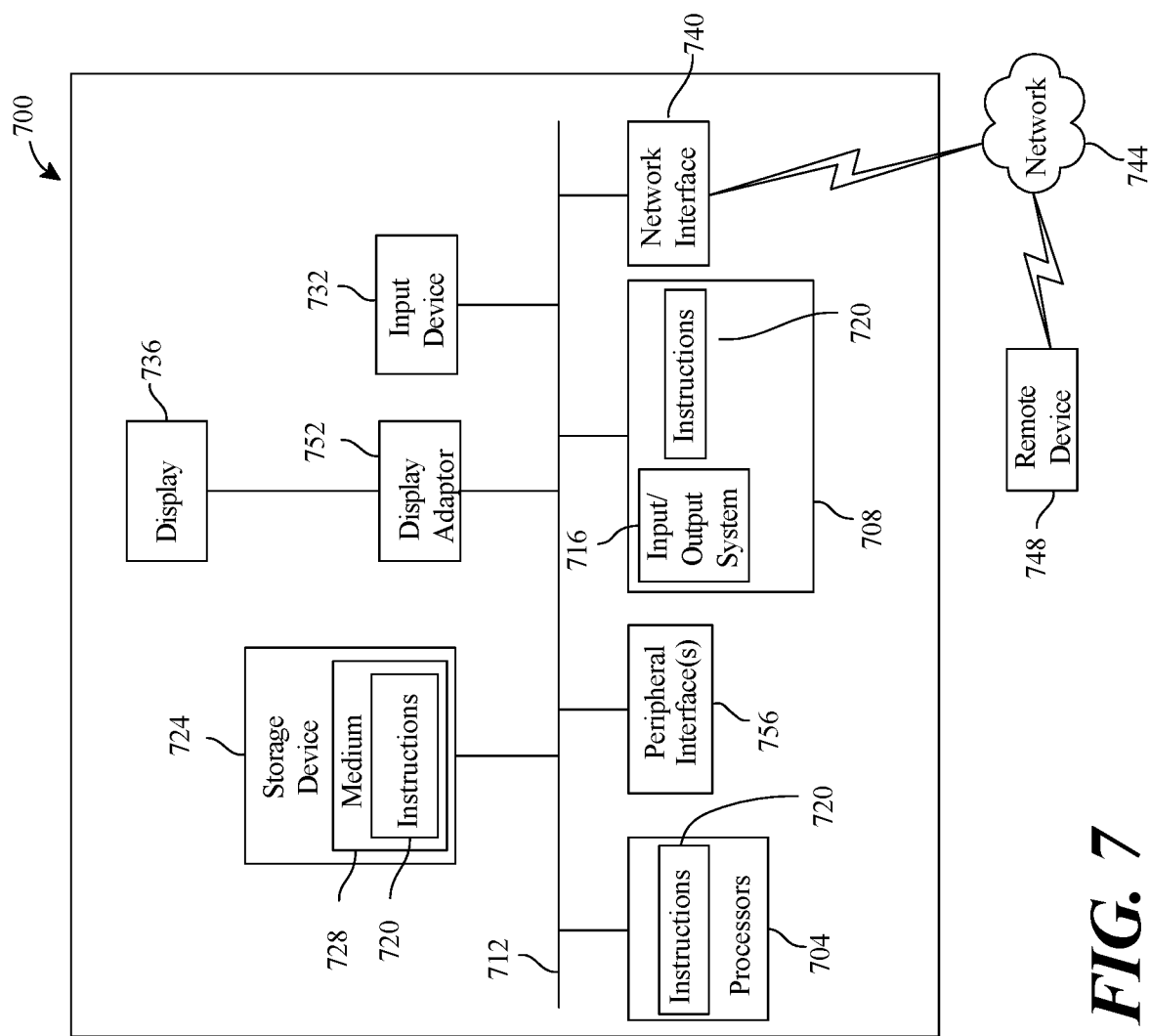
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatus according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for expanding contacts for a social networking platform, the apparatus comprising:
    at least a processor communicatively connected to a user device; and
    a memory communicatively connected to the processor, the memory containing instructions configuring the at least a processor to:
        determine potential contacts for a user, wherein determining is an automated process comprising:
            identifying a user identification on an immutable sequential listing, wherein the immutable sequential listing comprises at least a digitally signed assertion, and wherein the digitally signed assertion is a collection of textual data signed using a secure proof;
            retrieving activity data stored in the memory linked to the user identification, wherein activity data is retrieved utilizing a match function;
            retrieving a body of sets of user activity data as a function of the activity data, wherein the body of sets of user activity data comprise the at least a digitally signed assertion; and
            identifying potential contacts by generating the match function between the user and each set of the sets of the user activity data, wherein the match function includes a machine-learning model, wherein the machine-learning model correlates the user identification and outputs the sets of the user activity data;
        receive a selection input from a user device operated by the user, the selection input selecting a contact of the potential contacts;
        deliver an information request about the user comprising a list of strengths for selected contact to rank to a selected contact device, wherein generating the list of strengths for the selected contact comprises:
            generating a score as a function of one or more attributes for the selected contact;
            calculating a confidence index as a function of the score;
            generating the list of strengths for the selected contact as a function of a the confidence index and an ideal threshold; and
        receive an information response from the selected contact device; and
        add at least an element of the information response to a user profile, wherein the user profile is stored on the immutable sequential listing.

2. The apparatus of claim 1, wherein the at least a processor is communicatively connected to the user profile.

3. The apparatus of claim 2, wherein the at least a processor is configured to:
    request approval from the user device to add the at least an element of the information response to the user profile; and
    add the at least an element of the information response to the user profile if the at least a processor receives approval from the user device.

4. The apparatus of claim 2, wherein the at least an element of the information response identifies the selected contact who provided the information response.

5. The apparatus of claim 1, wherein the at least a processor is configured to provide to the selected contact device access to the user profile.

6. The apparatus of claim 1, wherein the information response describes a qualification of the user.

7. The apparatus of claim 1, wherein the information request is tailored by the user device.

8. The apparatus of claim 1, wherein identifying the user identification comprises identifying a digital signature.

9. The apparatus of claim 1, wherein the sets of the user activity data comprise a sub-listing on the immutable sequential listing.

10. A method for expanding contacts for a social networking platform, the method comprising:
  determining, by at least a processor, potential contacts for a user, wherein determining is an automated process comprising:
    identifying a user identification on an immutable sequential listing, wherein the immutable sequential listing comprises at least a digitally signed assertion, and wherein the digitally signed assertion is a collection of textual data signed using a secure proof;
    retrieving activity data stored in the memory linked to the user identification, wherein activity data is retrieved utilizing a match function;
    retrieving a body of sets of user activity data as a function of the activity data, wherein the body of sets of user activity data comprise the at least a digitally signed assertion; and
    identifying potential contacts by generating the match function between the user and each set of the sets of the user activity data, wherein the match function includes a machine-learning model, wherein the machine-learning model correlates the user identification and outputs the sets of the user activity data;
  receiving, at the at least a processor, a selection input from the user device selecting a contact of the potential contacts;
  delivering, by the at least a processor, an information request about the user comprising a list of strengths for selected contact to rank to a selected contact device, wherein generating the list of strengths for the selected contact comprises:
    generating a score as a function of one or more attributes for the selected contact;
    calculating a confidence index as a function of the score;
    generating the list of strengths for the selected contact as a function of a the confidence index and an ideal threshold; and
  receiving, at the at least a processor, an information response from the selected contact device; and
  adding, at the at least a processor, at least an element of the information response to a user profile, wherein the user profile is stored on the immutable sequential listing.

11. The method of claim 10, wherein the at least a processor is communicatively connected to the user profile.

12. The method of claim 11, wherein the at least a processor is configured to:
  request approval from the user device to add the at least an element of the information response to the user profile; and
  add the at least an element of the information response to the user profile if the processor receives approval from the user device.

13. The method of claim 11, wherein the at least an element of the information response identifies the selected contact who provided the information response.

14. The method of claim 10, wherein the at least a processor is configured to provide to the selected contact device access to the user profile.

15. The method of claim 10, wherein the information response describes a qualification of the user.

16. The method of claim 10, wherein the information request is tailored by the user device.

17. The method of claim 10, wherein identifying the user identification comprises identifying a digital signature.

18. The method of claim 10, wherein the sets of the user activity data comprise a sub-listing on the immutable sequential listing.

* * * * *